(12) United States Patent
Weilbacher, Jr.

(10) Patent No.: US 7,088,251 B2
(45) Date of Patent: Aug. 8, 2006

(54) MOLE DETECTOR

(76) Inventor: Ralph J. Weilbacher, Jr., 5424 Bohleysville Rd., Millstadt, IL (US) 62260

( * ) Notice: Subject to any disclaimer, the term of this patent is extended or adjusted under 35 U.S.C. 154(b) by 57 days.

(21) Appl. No.: 10/805,067

(22) Filed: Mar. 19, 2004

(65) Prior Publication Data

US 2005/0206525 A1  Sep. 22, 2005

(51) Int. Cl.
*G08B 23/00* (2006.01)
(52) U.S. Cl. ............ 340/573.1; 119/650; 119/720
(58) Field of Classification Search ........ 340/573.1; 119/650, 720, 721
See application file for complete search history.

(56) References Cited

U.S. PATENT DOCUMENTS

| | | | | |
|---|---|---|---|---|
| 4,187,634 A | * | 2/1980 | Kintz | 43/61 |
| 4,827,662 A | * | 5/1989 | Dahlman | 43/87 |
| 5,040,326 A | | 8/1991 | Van Dijnsen et al. | 43/58 |
| 5,953,853 A | | 9/1999 | Kim | 43/98 |
| 6,445,301 B1 | * | 9/2002 | Farrell et al. | 340/573.2 |
| 6,914,529 B1 | * | 7/2005 | Barber et al. | 340/573.2 |
| 2001/0054962 A1 | * | 12/2001 | Barber et al. | 340/573.2 |

* cited by examiner

*Primary Examiner*—Daniel Wu
*Assistant Examiner*—Travis Hunnings
(74) *Attorney, Agent, or Firm*—Haverstock, Garrett & Roberts LLP

(57) ABSTRACT

A mole or animal detector includes apparatus for placement over a portion of a soil surface overlaying a portion of a mole tunnel, including a detector or sensor and circuitry for detecting movement of the portion of the soil surface indicative of passage of a mole through the underlying tunnel portion and generating a signal representative thereof, the signal being directly observable or audible or otherwise sensible, or transmitted to a receiver operable for emitting a signal, for instance, at a remote location.

13 Claims, 3 Drawing Sheets

MOLE DETECTOR

TECHNICAL FIELD

This invention relates generally to apparatus for detecting the presence of a mole in a mole tunnel beneath the soil surface, and, more particularly, to a mole detector which externally detects or senses raising or lifting or other disturbance of surface soil over the tunnel representative of presence of the mole, and which detector emits a signal representative of such disturbance and thus the presence of the mole to allow and/or facilitate trapping or otherwise removing or eliminating the mole.

BACKGROUND ART

Various devices are known for capturing and killing rodents and animals such as moles in subterranean environments including tunnels located just beneath the soil surface. Reference in this regard Kintz U.S. Pat. No. 4,187,634, Van Dijnsen et al. U.S. Pat. No. 5,040,326, Kim U.S. Pat. No. 5,953,853, and Farrell et al. U.S. Pat. No. 6,445,301.

However, a shortcoming of the known devices is that they typically require some apparatus to be buried in, project into, or otherwise be present within a mole tunnel itself, which may require some hand digging. Also, moles may be less inclined to travel into areas of a tunnel that contain foreign objects or which have been extensively or unnaturally disturbed, altered or modified. Further, some of the known devices include spring loaded elements and/or poisons, that can present a danger to children and other persons, as well as pets.

Therefore, what is sought is a mole detector which is less, if at all, invasive into a tunnel, is easy and convenient to use, and which presents no danger to persons that come into contact with it, yet which is effective for detecting the presence of moles and other animals in relatively shallow subterranean tunnels.

DISCLOSURE OF THE INVENTION

According to the invention what is disclosed is a mole or animal detector including, apparatus for placement over a portion of a soil surface overlaying a portion of a mole tunnel, including a detector or sensor and circuitry for detecting movement of the portion of the soil surface indicative of passage of a mole through the underlying tunnel portion and generating a signal representative thereof. The signal can be directly observed or heard by a person to enable the person to take action with regard to the mole or other animal, such as killing the mole or animal in place in the tunnel, or removing it and killing or trapping it, or the signal can be transmitted or conveyed to a remote receiver signal device operable for emitting a visible, audible or otherwise sensible signal indicative of the presence of a mole or other animal in the tunnel. Preferably, the soil over the tunnel under the apparatus is first tamped down, such that the mole or animal will lift or raise the tamped soil, thereby actuating the detector.

DETAILED DESCRIPTION OF THE PREFERRED EMBODIMENTS

Figure 1:
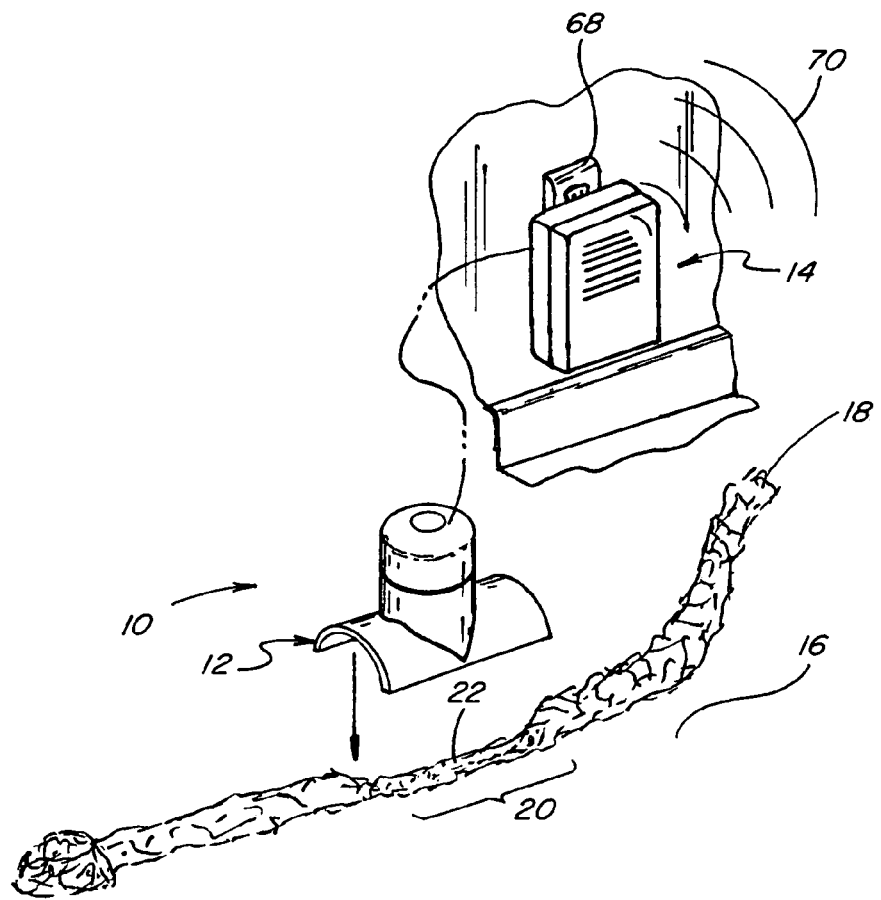
FIG. 1 is a perspective representation of a soil surface including an elongate raised soil section representative of soil covering a mole tunnel, showing a portion of the soil covering the mole tunnel compacted to collapse an underlying portion of the tunnel, and a mole detector of the present invention positioned for placement over the compacted soil along with a receiver/signal device of the invention.

Referring now to the drawings, in FIG. 1a mole detector 10 constructed and operable according to the teachings of the present invention is shown. Mole detector 10 includes detector apparatus 12 and a separate receiver/signal device 14. Detector apparatus 12 is shown in position for placement on a soil surface 16 exhibiting or including evidence of subterranean mole habitat, particularly well known elongate tunnels (not shown) located just below soil surface 16. Evidence of such relatively shallow subterranean tunnels typically includes an elongate trace of raised, broken soil, such as denoted at 18. Generally, traces such as trace 18 are formed as a small animal such as a mole or other rodent burrows through the soil just beneath the surface for foraging insects from plant roots lying just beneath the surface. It has been observed that after traces such as a trace 18 are formed, if holes or openings not made by the mole or other animal appear, they will be patched or filled by the animal to prevent exposure of the tunnel interior to the outside environment. It has been additionally observed that moles will often repair and reopen portions or sections of their tunnels that have been collapsed due to natural causes, and due to being stepped on by a human or animal foot or rolled over by a vehicle wheel. In contrast, it has been observed that some moles and other rodents will have a tendency to avoid foreign or unfamiliar objects placed in a previously dug tunnel such as the one represented by trace 18, such that the effectiveness of traps and detectors that require placement of foreign elements in and/or in proximity to tunnels, or which require unnatural or unusual alternation of a tunnel, may be less effective as the mole may have a tendency to avoid those portions of the tunnels containing such elements or which have been so altered.

Detector apparatus 12 constitutes an effort to avoid the requirement of placing a foreign element in or in close proximity to the interior of a mole tunnel, and unnatural or unusual alterations or modifications of a mole tunnel, by providing detection of disturbance of soil over the tunnel, such as represented by trace 18, indicative of movement or other activity of a mole in or though the underlying tunnel. In this way, no foreign object or element is introduced into the tunnel itself. As an example, detection apparatus 12 is shown in position for placement over a portion 20 of trace 18 for detecting disturbance and/or movement of soil 22 within portion 20. To facilitate detection, portion 20 of trace 18 is shown tamped or pressed down somewhat, which can be easily accomplished, for instance, using one's foot or hand, a shovel, or a piece of lumber, or the like, to partially reduce the sectional area of the underlying tunnel. This is with the intent that the mole or other rodent or animal will be required to lift or raise, or otherwise disturb overlaying soil 22, which will be detected by detector apparatus 12 which will cause the outputting of a signal indicating the presence of the mole or other animal, as explained next.

Figure 2:
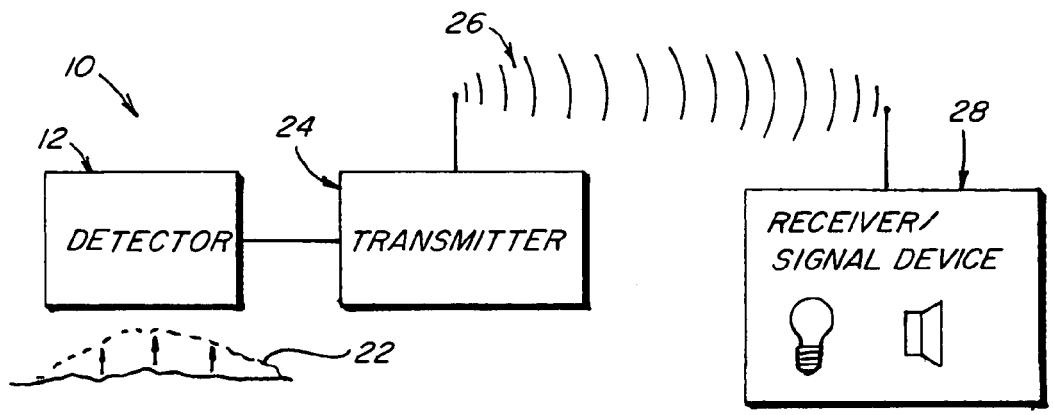
FIG. 2 is a schematic representation of elements of the mole detector of FIG. 1.

Referring also to FIG. 2, detector apparatus 12 is connected to a transmitter 24 and is operable for activating or sending an input signal to transmitter 24 or otherwise changing the state of transmitter 24 to cause transmitter 24 to emit an output signal as denoted at 26, through the atmosphere or over a suitable conductive path, such as a wire, cable or the like, to be received by a receiver/signal device 28 of mole detector 10 which, in turn, outputs a visible, audible or other signal indicative of the soil disturbance movement, and thus, presumably the presence of a mole or other animal in or near the vicinity of portion 20 of trace 18. An observer or recipient of the output signal from device 28 can then proceed to the location of portion 20 of trace 18 and take desired action, such as digging up and capturing or killing the mole or other animal.

Figure 3:
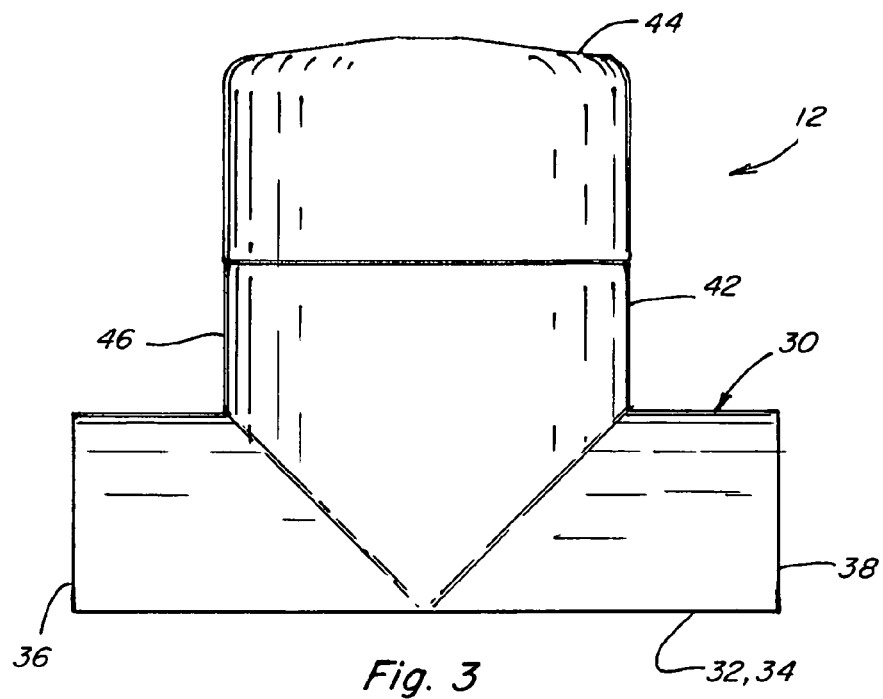
FIG. 3 is a side view of the detector of FIG. 1.
Figure 4:
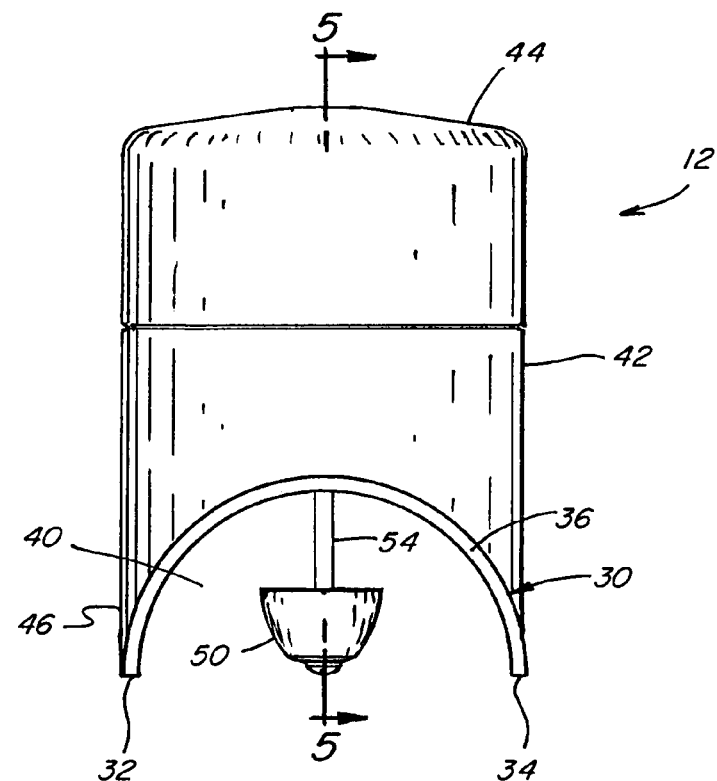
FIG. 4 is an end view of the detector.
Figure 5:
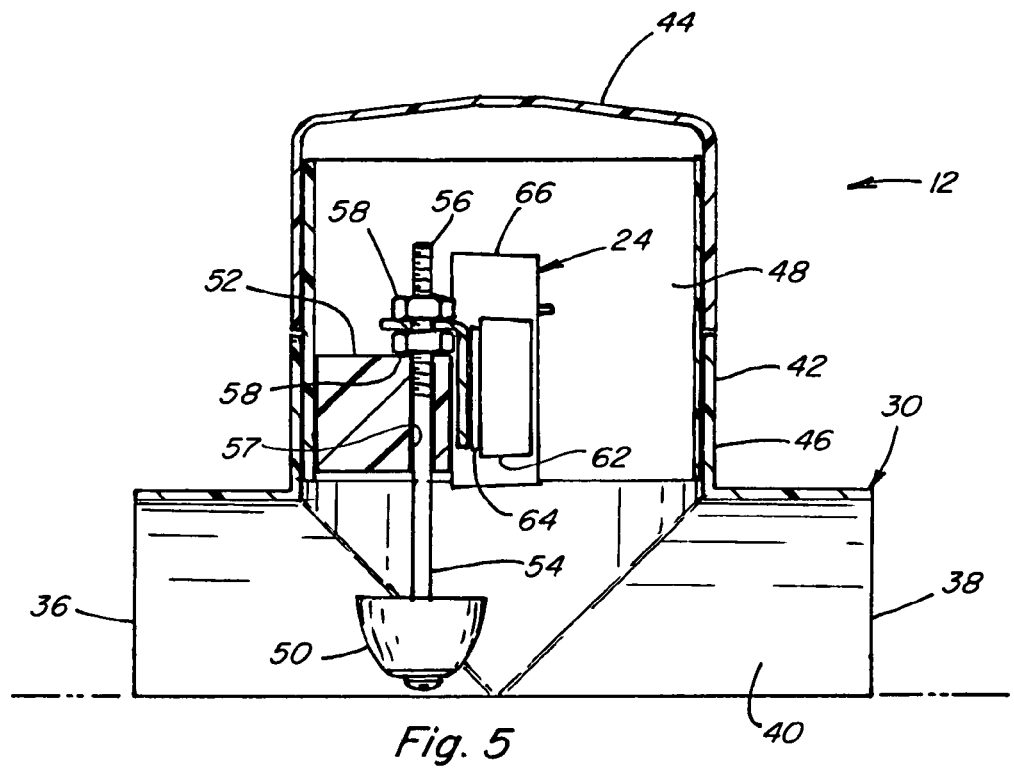
FIG. 5 is a cross-sectional view taken along line 5—5 of FIG. 4.

Referring also to FIGS. 3, 4 and 5, detector apparatus 12 is preferably supported in some simple manner in close proximity to a portion of a trace such as portion 20 of trace 18, so as to be capable of detecting disturbance or movement of soil representative of the movement of, and thus presence of, a mole in the underlying tunnel. A preferred manner of accomplishing this houses elements of apparatus 12 in an elongate, concave shell 30, preferably having a semi-cylindrical sectional shape (FIG. 4) extending between parallel, spaced lower edge portions 32 and 34, and opposite end portions 36 and 38, defining an elongate, downwardly and longitudinally open space 40. At about midway between end portions 36 and 38 of shell 30, shell 30 includes an upwardly extending hollow detector housing 42 including an enclosed or covered upper end portion 44 and a downwardly facing open lower end portion 46, defining an interior cavity 48 which is downwardly open and connects to space 40 of shell 30. A preferred shell 30 can be easily made from a common commercially available plastic plumbing pipe tee for 4 or 6 inch diameter piping, the long pipe section of which can be cut, such that space 40 will have a horizontal extend of at least about 3 inches so as to be capable of spanning a typical tunnel, and preferably from about 4 to 6 inches or so, and a vertical extent of 2 to 3 inches such that only the actuator will be contacted when a tamped down portion of an underlying tunnel is raised or lifted by a mole or other animal. Upper end portion 44 of the tee can be enclosed by a standard commercially available removable pipe cap.

Detector apparatus 12 includes an actuator 50 suspended from a support member 52 attached to detector housing 42 so as to be located at a desired position in space 40 such that when detector apparatus 12 is positioned over a portion of a trace, such as portion 20 of trace 18, upward or other movement or disturbance of soil 22 will cause actuation of detector apparatus 12 for causing transmitter 24 to output signal 26. Preferred actuator 50 has a bulbous or other suitable shape so as to be capable of resting on or being located in close proximity to soil 22 with only minimally or not at all disturbing the soil 20, particularly so as not to extend or project into the soil, so as to be less likely to be perceived as a foreign object or element or an unnatural or unusual occurrence in an underlying tunnel and so as to not further disturb the overlaying soil. Actuator 50 is also preferably relatively lightweight, such that slight upward lifting or raising or other forces or movements or disturbances of soil 22 will be sufficient to also lift or raise or otherwise actuate actuator 50 for activating detector apparatus 12, without significant risk of actuator 50 puncturing the soil and projecting into the underlying tunnel. Here, actuator 42 is suspended from support member 52 by an elongate shaft 54 including a threaded upper end 56 which passes through a generally vertical hole 57 in member 52, the vertical position of shaft 54 and actuator 50 being determined by the position of a nut 58 threadedly engaged with end 56 to prevent downward movement of shaft 54 through hole 57. This nut allows easily adjusting the position of actuator 50 in the space. An L-shape bracket 60 is supported on nut 58 and retained in position by a second nut 58. A magnet 62 is attached to a downwardly extending leg of bracket 60 with double sided tape 64, or other adhesives or fasteners, or in any other suitable manner in proximity to a magnetic switch 66 connected in circuit with transmitter 24. The adjustability of the nut also allows adjusting the position of the magnet relative to the switch.

Magnetic switch 66, transmitter 24 and receiver/transmitter device 28 are preferably well known, commercially available devices purchasable together as a unit, for instance, from Desa International, Inc., of Bowling Green, Ky., U.S.A. In operation, movement of magnet 64 relative to magnetic switch 66 of transmitter 24 is operable to change the state of magnetic switch 66 to activate transmitter 24 for outputting signal 26, which here is a radio signal through the atmosphere, for receipt by receiver/signal device 28, which can be located some maximum distance from transmitter 24, as determined by the range of the transmitter and sensitivity of the receiver selected, battery strength, atmospheric conditions, and the like. Transmitter 24 is preferably powered by a battery contained therein, but can also be alternatively powered by any suitable energy source, such as by connection to a source or household current, solar power or wind power. Likewise, receiver/signal device 28 can be powered by an internal or external battery, household power, such as by connection to an outlet such as outlet 68 (FIG. 1) or it can be alternatively powered by a solar or wind source, or the like.

Figure 6:
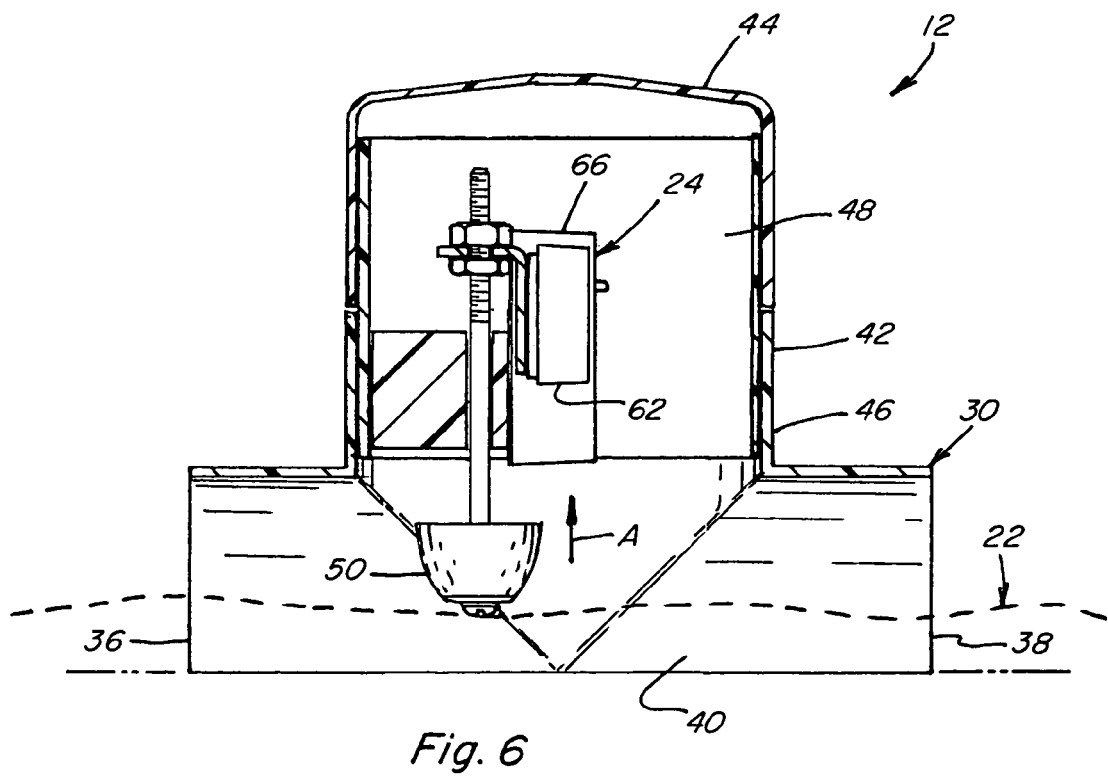
FIG. 6 is an alternative sectional view along line 5—5 of FIG. 4, showing an actuator of the detector in an alternative position.

FIG. 6 shows detector apparatus 12 with actuator 50 lifted by soil 22 (in phantom) showing resultant movement of magnet 62 relative to magnetic switch 66 of transmitter 24 for actuating the transmitter, as denoted by arrow A, representative of disturbance or movement of soil 22 as a result of presence in or passage through of a mole or other animal in the underlying tunnel. As a result, signal 26 would be sent to and received by receiver/signal device 28, which would emit an output signal 70 (FIG. 1), which is preferably an audible signal, but which could alternatively or also be a visible or other signal such as a vibratory signal common with commercially available personal beepers.

The location of actuator 50 and transmitter 24 of detector apparatus 12 within detector housing 42 of shell 30 protects those elements from adverse weather conditions, such as rain and hail, and also winds which could possibly result in false detections. The elongate contact of lower edge portions 32 and 34 with the ground also provides a stable base that when edge portions 32 and 34 are suitably spaced apart can be spaced from the broken soil of a trace such as trace 18, such that detector apparatus 12 is not easily moved by wind, waterflow over the ground, partial collapse of the mole tunnel or softening of the ground due to saturation with water. Although apparatus 12 is relatively lightweight, the weight is distributed over the length of edge portions 32 and 34 such that apparatus 12 will not significantly sink into soft soil nor will it leave permanent visible marks on the soil. It is also thought that the ability to position detector apparatus 12 over a section of a trace such as trace 18, without actually contacting the trace, reduces the possibility that a mole or other animal will avoid the effected portion of the trace. In this regard, it has been observed that when small sections of a trace are compacted such as due to foot or vehicular traffic, such sections are typically repaired by the mole and continue to be used. This is contemplated to be particularly true where the trace extends between habitats, or to a rich food source such as a lawn or field containing insects such as grubs and the like. By collapsing or tamping a portion of the overhead roof structure of the tunnel, it is anticipated that continued use of the tunnel will entail lifting or raising the tamped or collapsed portions by the mole or other animal, which would serve as ideal movement or disturbance for detection by the present apparatus. An advantage that should be noted here is that such repairs would constitute relatively significant movement, which would be easily detected, such that apparatus 12 would not be required to be highly sensitive. This is an advantage because it is believed that the less sensitive apparatus 12 is to movement, the lower possibility of occurrence of false detections, such as by movement of heavy trucks or equipment, wind, and even heavy footfalls, nearby lawn mowing, and the like. However, it is still contemplated that apparatus 12 could include elements capable of detecting very slight movements or disturbances of underlying soil such as could be generated by movement of a mole or other animal through an undisturbed trace 18. In this regard, it is contemplated that the sensor or detector of apparatus 12 could use a non-soil contacting sensor or detector operable to detect movement of underlying soil, which would be adjusted or tuned so not to signal when inconsequential movements occur as a result of wind, rainfall, and the like.

As another advantage, by tamping a portion of the soil overlaying a tunnel so as to be at least generally level with the adjacent soil areas, then placing apparatus 12 over the tamped portion resting on the adjacent soil, actuator 50 will be positioned at a desired, consistent elevation above the tamped soil, or could be in contact with the soil, as desired, such that no adjustment of the actuator position is required for use at different locations. In this way, apparatus 12 is easy to use and can be expected to obtain consistent results. If adjustment is necessary or desired, the position of actuator 50 can be changed and consistent results will be obtained as long as the soil is prepared in generally the same way and the apparatus is used in the same manner. As another possible advantage, it is contemplated that utilization of an elongate covering structure, such as shell 30, serves as a cover over a collapsed or tamped down portion of a trace which makes it more likely to be repaired, as the sky is not directly visible and thus the mole or other animal would be less repelled by sunlight, rain, wind, and possible predators, such as birds and the like. Here, however, it should be noted that it is contemplated that, as an alternative to shell 30, a more open, lighter structure, such as one or more thin legs, pegs, or the like could be utilized for supporting actuator 50 and transmitter 24, which can be held in position by spiking or the like.

As still another advantage, the commercially available transmitter and receiver/signal devices such as those set forth above purchasable together as a unit, for instance, from Desa International, Inc., of Bowling Green, Ky., U.S.A., can be selectably operable over more than one transmitting and receiving frequency, such that several of the present detectors can be used simultaneously in the same transmitting area. Additionally, the receiver/signal devices can have one or more selectable audible signal outputs, such that if several are used, detection of movement in a particular tunnel can be discerned by a different audible signal. Still further, it is contemplated that in addition to, or as an alternative to, the receiver/signal device disclosed above, the detector device of the invention could include a signal device, preferably one such as a signal light that when activated would signal a human when present nearby but not alarm a mole or other animal moving in an underlying tunnel. In this way a user, upon hearing an audible tone indicative of mole activity in one of several tunnels could proceed to that tunnel with the activated signal device.

To facilitate determining the whereabouts of a mole or other animal in a tunnel over which apparatus 12 is used, or to allow better determining which of several tunnels a mole is in, one or more other small visible portions of the tunnel or tunnels can also be tamped down in the vicinity of apparatus 12 so that when the detection signal is emitted and a user proceeds to the area, visible repairs cam provide clues as to which direction the mole has traveled from. If the person reaches the detector quickly, the mole or other animal will likely be in the tunnel quite near or still beneath the detector and the person can simply plunge the blade of a shovel, pick, or the forks of a pitch fork or other lethal device through the soil into the tunnel to kill the mole or other animal or unearth the mole for trapping or killing. Thus, apparatus 12 can be used without danger to children and pets and without unnaturally disturbing the soil. If the animal is killed in place in its tunnel, it can be left there to decompose or be eaten by predators. If it is unearthed, the only soil damage is a shovel mark or a small amount of overturned soil, which can be easily returned to it original place. No extensive digging of a mole tunnel is required and once the mole has been eliminated, the tunnel system can be allowed to return to its original state or can be tamped down as desired. As another advantage, the exterior of apparatus 12 can be decorative, for instance, so as to resemble a lawn ornament, or a natural stone, rock or plant.

Thus, there has been shown and described a novel mole detector, which overcomes many of the problems set forth above. It will be apparent, however, to those familiar in the art, that many changes, variations, modifications, and other uses and applications for the subject device are possible. All such changes, variations, modifications, and other uses and applications that do not depart from the spirit and scope of the invention are deemed to be covered by the invention which is limited only by the claims which follow.

What is claimed is:

1. A mole detector, comprising:

apparatus for placement over a portion of a soil surface overlaying a portion of a mole tunnel, including a sensor and circuitry for detecting movement of the portion of the soil surface indicative of passage of a mole through the underlying tunnel portion and generating a signal representative thereof;

wherein the apparatus comprises a concave shell having elongate lower edge portions and an unwardly extending semi-cylindrical inner surface extending between the lower edge portions defining a space, the lower edge portions being positionable on the soil surface adjacent opposite sides of the portion of the soil surface overlaying the mole tunnel, respectively, such that the portion of the soil surface overlaying the mole tunnel is located in the space:

wherein the shell includes a cavity in an upper portion of the inner cylindrical surface connecting with the space, and the sensor is located in the cavity so as to project downwardly into the space in a position over the portion of the soil so as to be contacted by upward movement thereof; and wherein the sensor includes an actuator disposed in the space and movable by contact with the upwardly moving soil to actuate a signal generator for emitting a signal indicative of the movement.

2. The mole detector of claim 1, wherein the signal generator operates a transmitter to emit a signal when movement of the portion of soil is detected, and the mole detector additionally includes a receiver separate from the transmitter operable for receiving the signal and responsively emitting a second signal.

3. The mole detector of claim 2, wherein the actuator comprises a magnetic proximity switch.

4. The mole detector of claim 2, wherein the actuator includes a movable member that projects downwardly into the space and at least one element allowing adjusting a position of the movable member in the space.

5. A mole detector, comprising;
   a concave shell including spaced apart lower edges extending between opposite open ends, the lower edges being positionable on a soil surface on opposite sides of soil above a mole tunnel such that the concave shell overlays the soil above the tunnel;
   a sensor operable for detecting movement of the soil underlaying the shell indicative of movement through or presence of a mole in the tunnel below and changing a state;
   a transmitter operable when the state is changed for transmitting a signal representative thereof;
   a receiver operable for receiving the transmitted signal and outputting a signal indicative thereof; and
   wherein the sensor includes an actuator which extends into the space between and just above the lower edges in a position to be contacted by upward movement of soil located between the upper edges.

6. The mole detector of claim 5, wherein the space between the lower edges of the concave shell has a horizontal extent between the lower edges which is at least 3 inches.

7. The mole detector of claim 5, wherein the sensor comprises a magnetic proximity switch.

8. The mole detector of claim 5 wherein the transmitter is operable when the state is changed for transmitting the signal representative thereof over the atmosphere to the receiver.

9. An animal detector, comprising:
   a concave shell including spaced apart lower edges extending between opposite open ends, the lower edges being positionable on a soil surface on opposite sides of soil above a tunnel such that the concave shell overlays the soil above the tunnel;
   a detector operable for detecting movement of the soil underlaying the shell indicative of movement through or presence of an animal in the tunnel below and operates a switch;
   a transmitter operable when the switch is operated for transmitting a signal representative thereof;
   a receiver operable for receiving the transmitted signal and outputting a signal indicative thereof; and
   wherein the switch is a magnetic proximity switch operable by movement of an actuator of the detector in proximity thereto as a result of movement of the underlying soil.

10. A mole detector, comprising:
    apparatus for placement over a portion of a soil surface overlaying a portion of a mole tunnel, including a sensor and circuitry for detecting movement of the portion of the soil surface indicative of passage of a mole through the underlying tunnel portion and generating a signal representative thereof;
    wherein the signal generator operates a transmitter to emit a signal when movement of the portion of soil is detected and the mole detector additionally includes a receiver separate from the transmitter operable for receiving the signal and responsively emitting a second signal; and
    wherein the actuator includes a movable member that projects downwardly into the space and at least one element allowing adjusting a position of the movable member in the space.

11. The mole detector of claim 10, wherein the apparatus defines a space and a cavity connecting with an upper portion of the space, and the sensor is located in the cavity so as to project downwardly into the space in a position over the portion of the soil so as to be contacted by upward movement thereof.

12. The mole detector of claim 11, wherein the sensor includes an actuator disposed in the space and movable by contact with the upwardly moving soil to actuate the signal generator.

13. The mole detector of claim 10, wherein the actuator comprises a magnetic proximity switch.

* * * * *